May 2, 1939.  D. M. SUTHERLAND, JR  2,156,321
FIBER PULP REFINER
Filed April 1, 1936  7 Sheets-Sheet 1
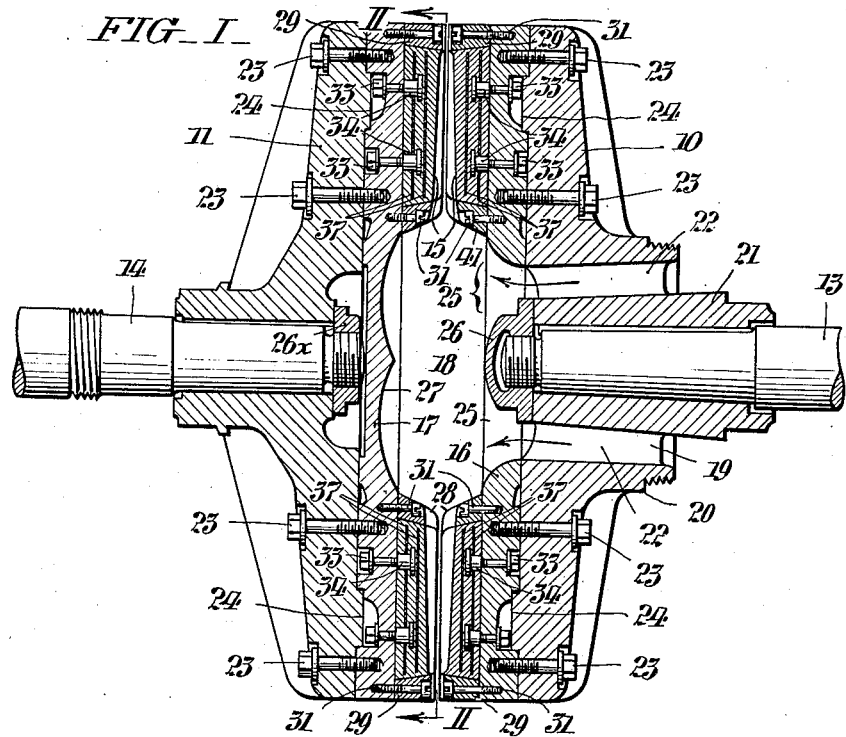
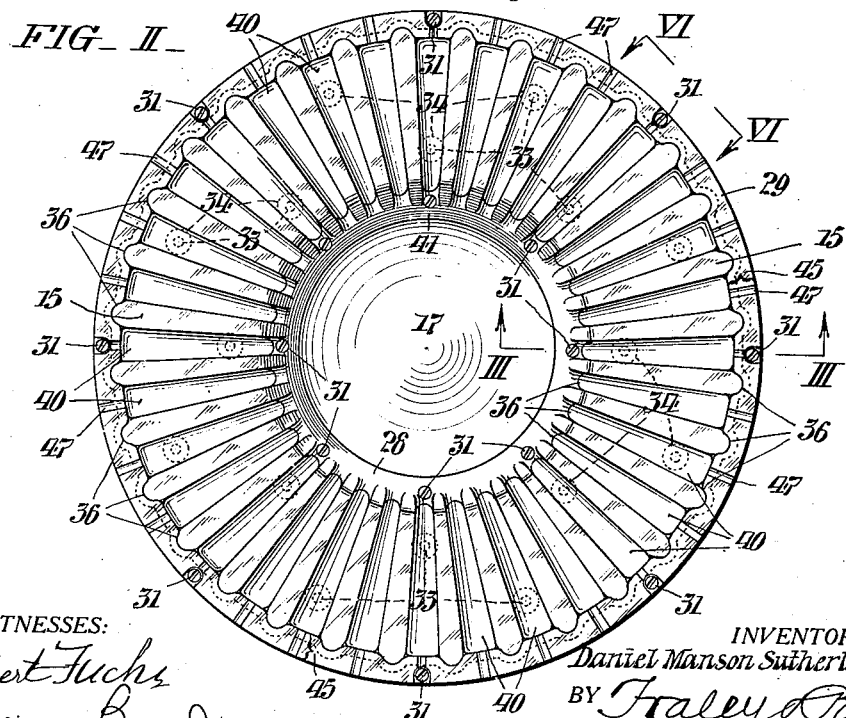

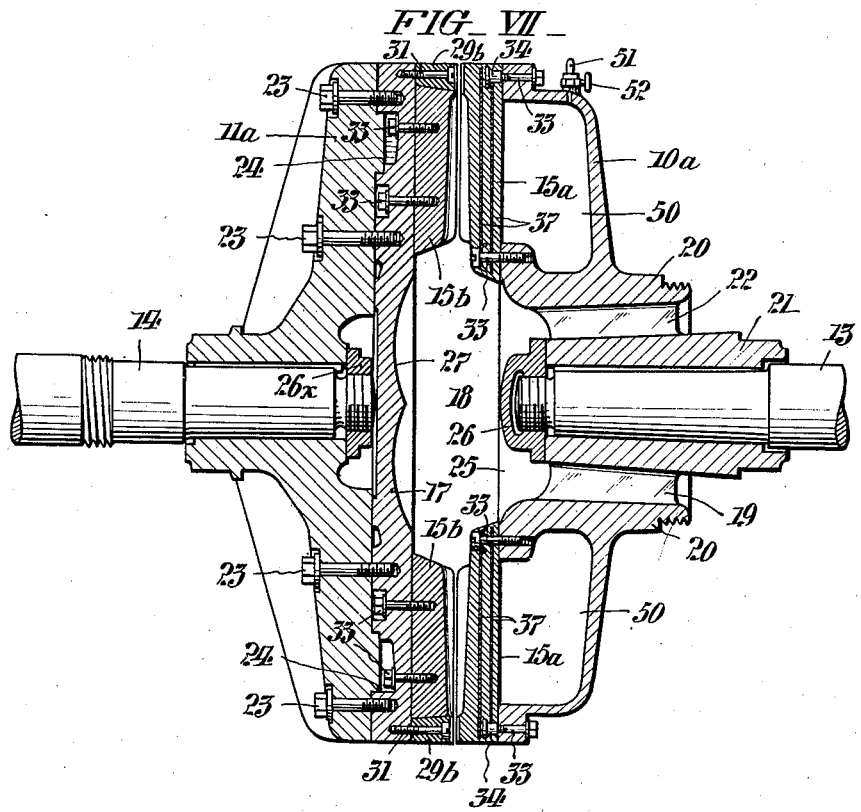
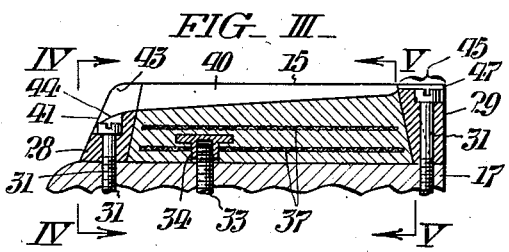
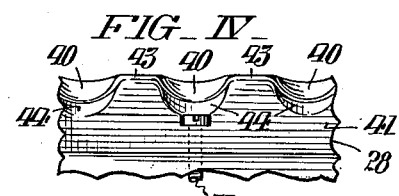
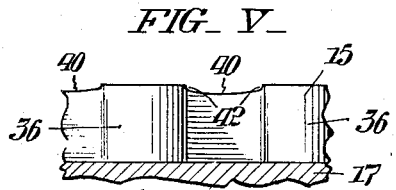
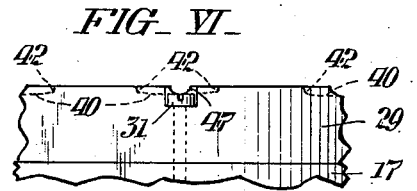

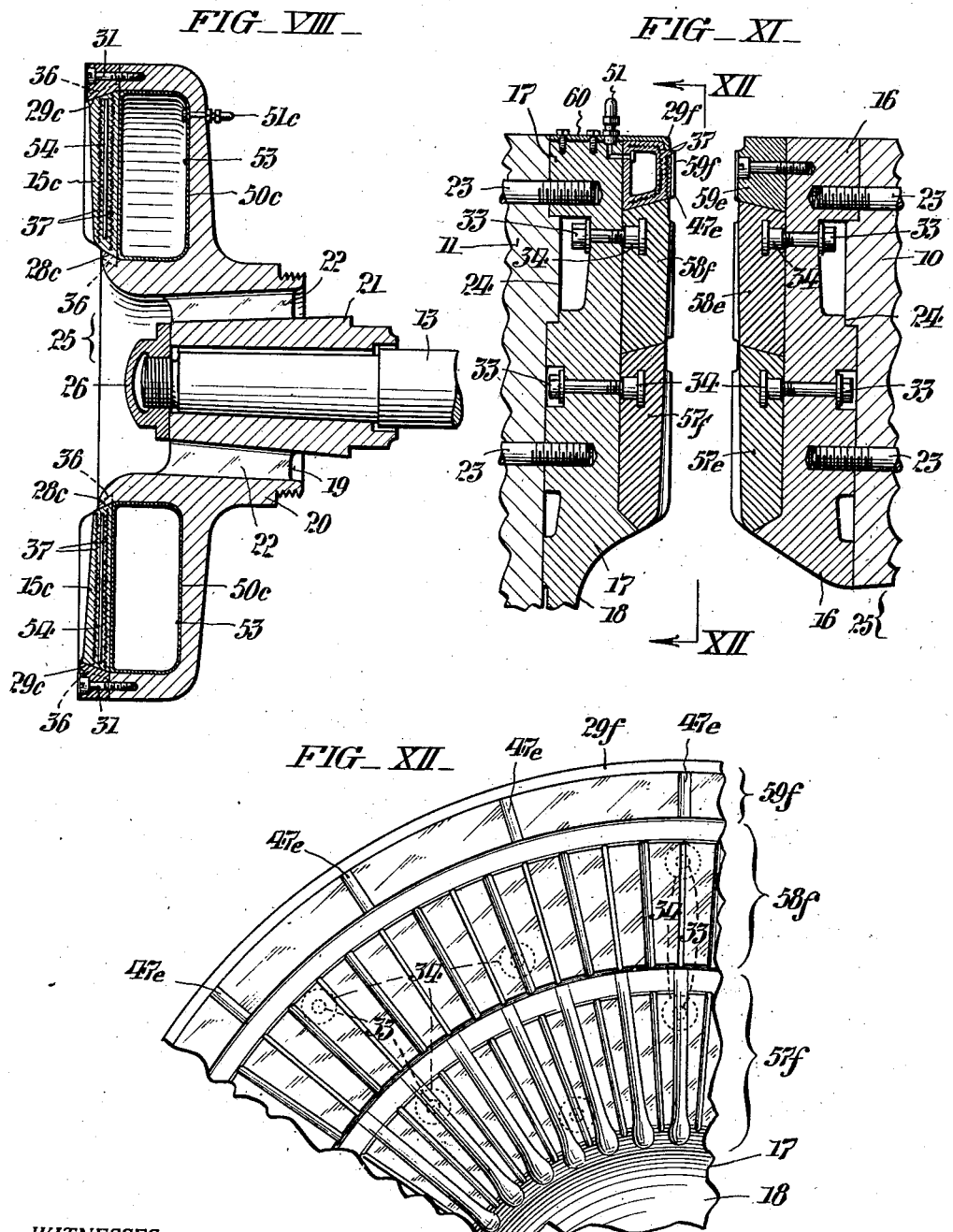

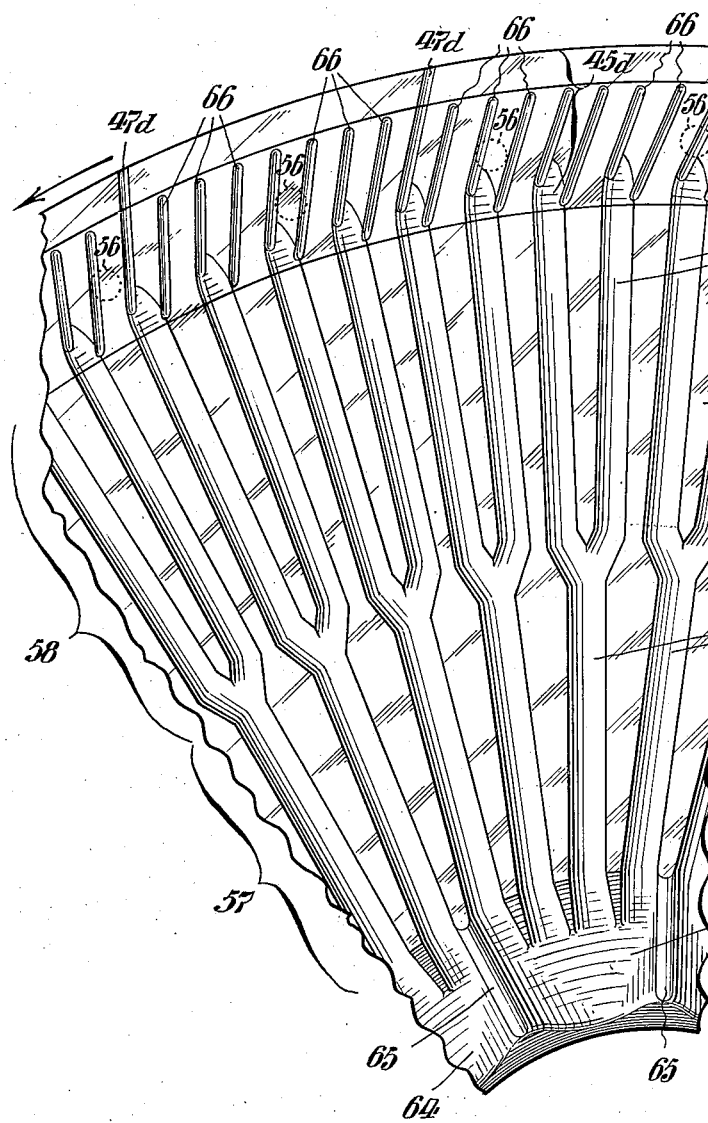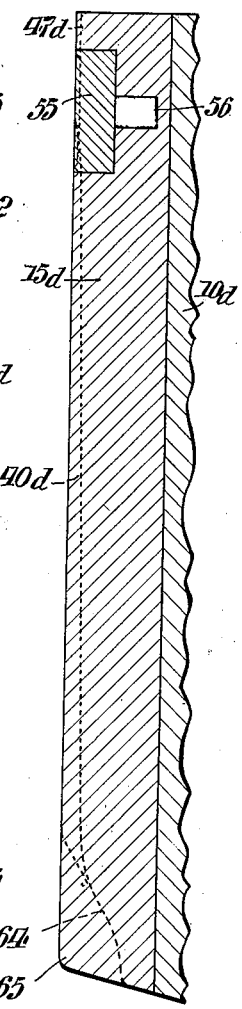

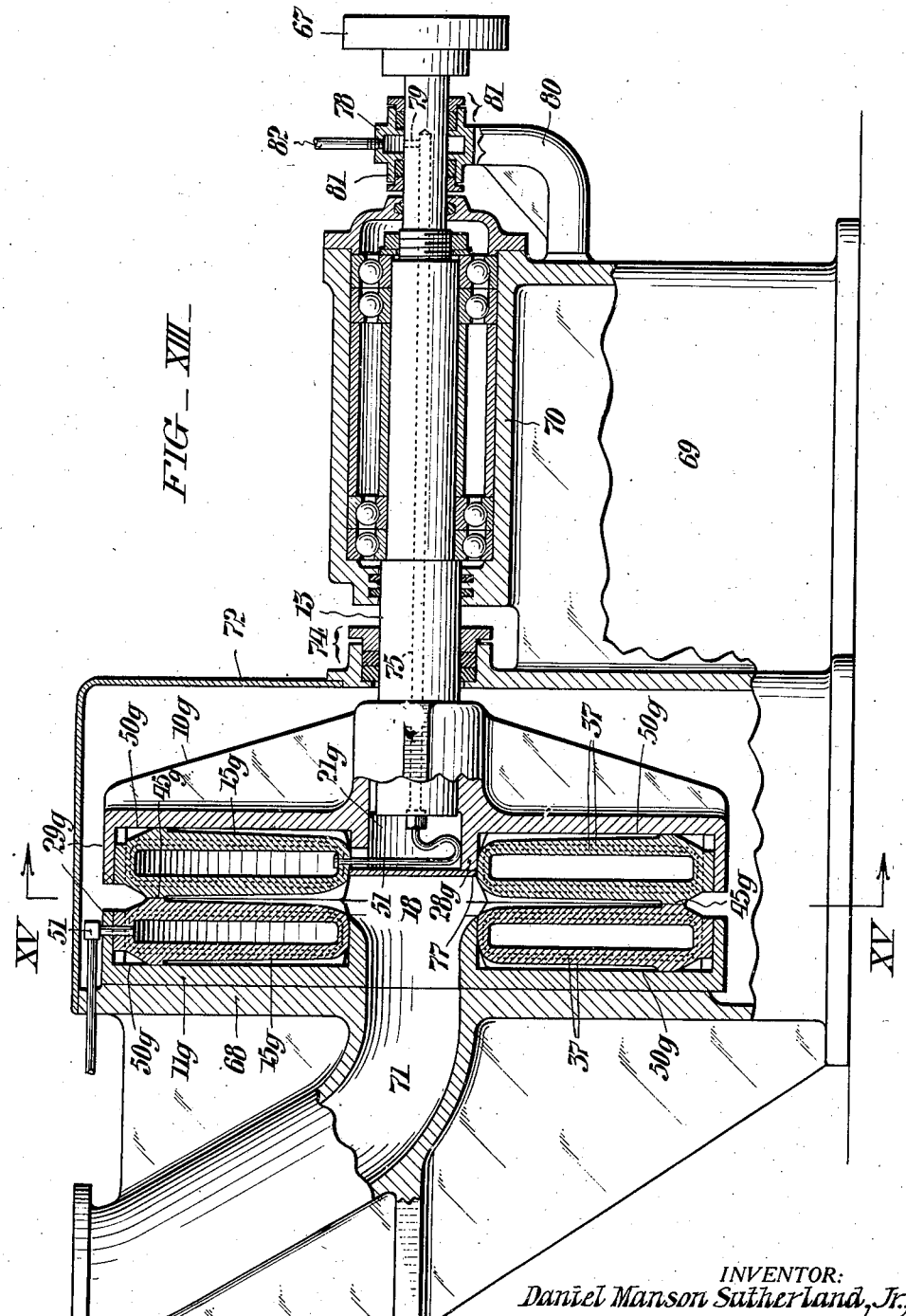

May 2, 1939.　　　D. M. SUTHERLAND, JR　　　2,156,321
FIBER PULP REFINER
Filed April 1, 1936　　　7 Sheets-Sheet 6
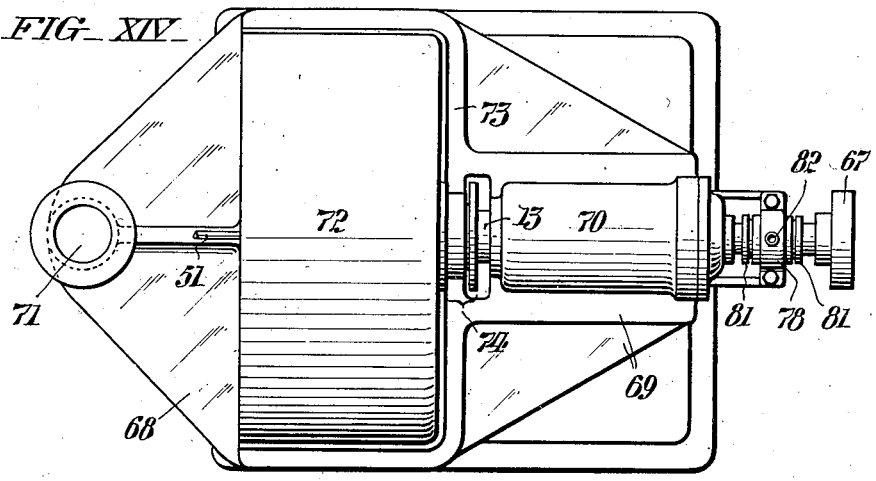
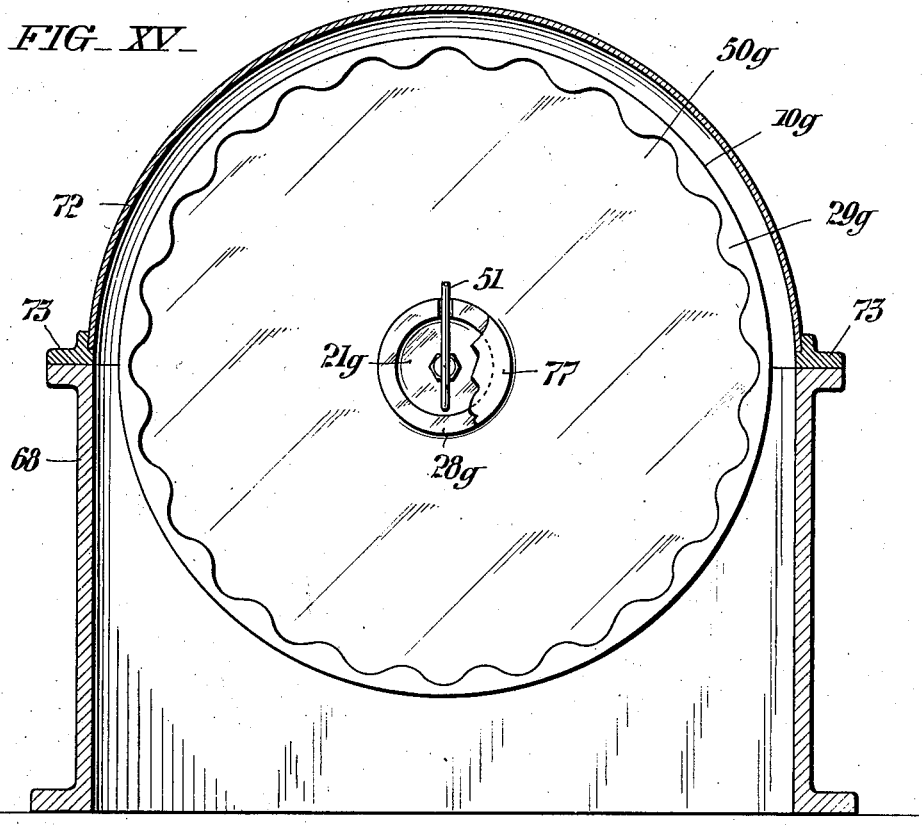
WITNESSES:
Hubert Fuchs
William Bell, Jr.
INVENTOR:
Daniel Manson Sutherland, Jr.,
BY Frally Paul
ATTORNEYS.

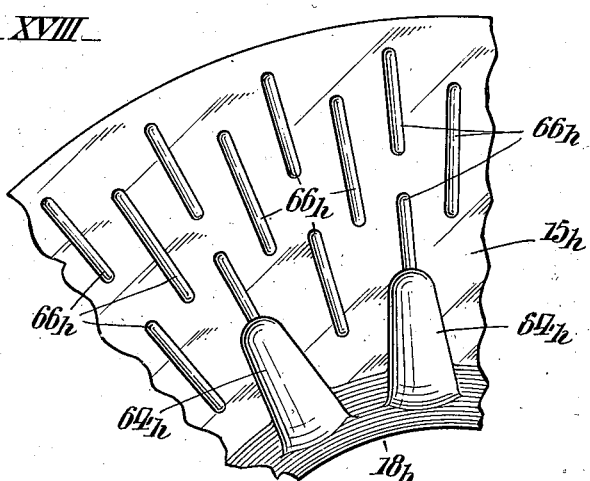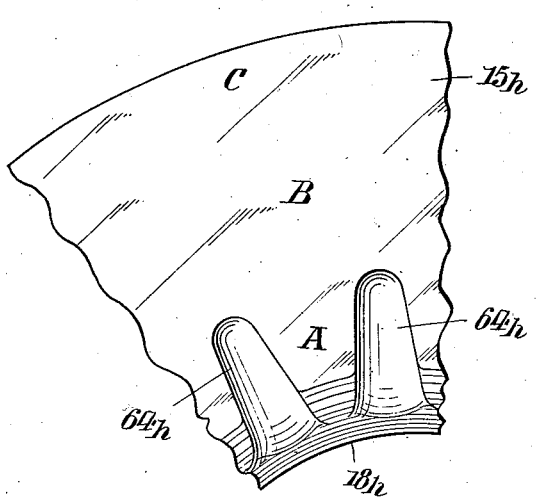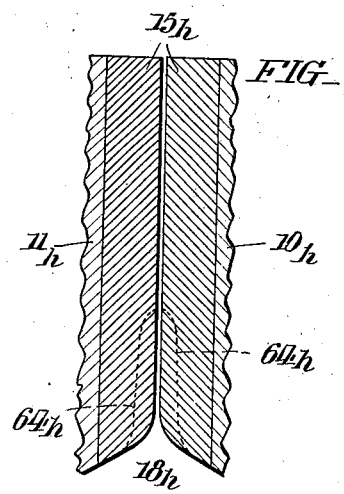

Patented May 2, 1939

2,156,321

UNITED STATES PATENT OFFICE 2,156,321

FIBER PULP REFINER

Daniel Manson Sutherland, Jr., Morrisville, Pa., assignor to Lionel M. Sutherland, Trenton, N. J., and Douglas G. Sutherland, Morrisville, Pa.

Application April 1, 1936, Serial No. 72,083

14 Claims. (Cl. 92—26)

My invention relates to the reduction and refining of fibrous materials, such as wood, leather, or cork, and especially to the treatment of "fiber pulp", consisting of fibrous particles in association with liquid, generally water. With sufficient water or the like, the aggregate or suspension itself behaves as a liquid, and can thus be more easily fed and handled. For wood pulps, it is generally satisfactory to use from three to six parts fiber and ninety-seven to ninety-four parts of water, although other proportions may be used, if preferred for any reason. Materials may be treated dry, provided they can in that condition be fed without clogging between the relatively moving refining surfaces or members by whose coaction the fiber particles are reduced.

Heretofore, the coacting refining surfaces or members employed have been of hard, rigid character, such as discs of metal or stone. I have discovered that considerable advantage can be realized by employing surfaces or members of yielding, elastic character. In general, I prefer to secure the desired elasticity by the use of highly yielding, elastic friction materials for the acting surfaces or facings, like rubber or gutta percha, rather than by extreme thinness of metal or other such harder, stiffer materials. The elasticity to be had in view involves not merely a high "elastic limit", representing ability to return to the original shape or dimensions after great deformation or distortion, but also a low modulus of elasticity, which is the ratio of stress to the corresponding elastic deformation or strain produced thereby. Sufficiently marked elasticity of the rubber, gutta percha, or other material forming the surfaces results in their elastic deformation by the pulp or by the fibrous particles, giving a better action on the fiber. Rubber vulcanized to about the degree of yielding elasticity commonly employed for automobile tires (casings) exemplifies the general idea of a preferred material, although rubber or other elastic friction material substantially harder or softer than this may also be used. Or, to express the matter differently, the modulus of elasticity of the facing should preferably approximate (or even be lower than) that of the fibrous material to be treated in general order of magnitude, rather than that of the metal or stone surfaces heretofore used.

Along with their elastic action, friction materials like rubber and (to a less extent, perhaps) gutta percha present another important advantage over hard materials like metal or stone, best expressed, perhaps, by the very name "friction" that is often applied to them in the rubber art. This is the pronounced resistance of elastic rubber (such as used for tires) against sliding. Refining surfaces of such rubber retain this property as they wear; whereas surfaces of metal or stone tend to become smooth or even take a high polish, so that they have less hold on the fiber particles.

Practically, it is generally preferable to employ a suitable facing thickness of elastic material with a rigid backing, rather than to make the refining member wholly of elastic material. The elastic material should be free of coloring matter that might color the fiber treated: e. g., rubber used for the purpose should not contain the carbon black used in tires. But a white or practically colorless filler is not objectionable.

Instead of intrinsic elasticity of the surface material itself, resilient backing of a suitably strong, tough, yielding or flexible friction layer or web may be relied on to give a surface of the desired elasticity: e. g., a surface layer of solid, impervious tire-rubber backed with sponge-rubber, or sustained by elastic-fluid pressure. For yieldingly sustaining a flexible facing in effective coaction with the associated refining member, sponge rubber, by virtue of its cellular structure, forms an elastic fluid cushion analogous in practical behavior to the other form of elastic fluid cushion hereinafter described, consisting of a rubber-walled cell charged with gas, like an inner tube of a pneumatic tire. Preferably, such a web of rubber, gutta percha, or other friction material should be reinforced with fabric, like an automobile tire-casing, or a flexible disc for a universal joint.

It is not always necessary that both of the coacting surfaces be elastic, or elastic throughout their entire extent: e. g., one of the facings may be elastic, and the other rigid like the metal or stone heretofore employed; or one or both of them may be highly elastic in certain zones only, and less elastic or even rigid in other zones.

I have hereinafter first explained my invention with particular reference to its embodiment in a refiner of attrition mill type comprising relatively revolving flat, friction-faced refining discs, with flow-grooves for continuous flow of pulp across their working faces, and flow-control zones around the latter. However, it is to be understood that the invention is not in its broader aspects limited to any particular type or form of refining members, or of their facial features, but extends to refining members that are flat, conical, or radially curved in profile so that their parallel (or contacting) working faces enlarge outward around their axes and are traversed transversely of the (circumferential) direction of their relative movement by the fiber stock or pulp being treated as well as attrition mills. Of the coacting, parallel-moving, "mated" or mutually-corresponding refining members, either one only or both may actually move; and if both move or revolve, they may revolve, substantially coaxially, either in opposite directions, or in the same direction at different speeds. Hence in speaking of the coacting refining members as "revolving" or as "parallel-moving", only the character of their relative movement is referred to, without any implication as to whether both or only one of them actually moves. Illustrative speeds are 900 R. P. M. each for oppositely-revolving refining members, or 1200 R. P. M. where only one revolves, and the other remains stationary. But these speeds are merely illustrative.

Another feature of my invention is a novel type of facial configuration for the refining surfaces, useful for rigid-faced refining members as well as for those with elastic faces.

Still other features and advantages of my invention will appear from the following description of species or forms of embodiment thereof, and from the drawings.

In the drawings, Fig. I shows a vertical axial section through a pair of coacting rotary refining members adapted for the purposes of my invention.

Fig. II is a face view of one of the refining members shown in Fig. I, taken as indicated by the line and arrows II—II in Fig. I.

Fig. III is a sectional and edge view with the refining member in radial section as indicated by the line and arrows III—III in Fig. II.

Fig. IV is a fragmentary inner edge view of the refining member, taken as indicated by the line and arrows IV—IV in Fig. III.

Fig. V is a fragmentary sectional view of the refining member, taken as indicated by the line and arrows V—V in Fig. III.

Fig. VI is a fragmentary outer edge view of the refining member, taken as indicated by the line and arrows VI—VI in Fig. II.

Fig. VII is a view similar to Fig. I, illustrating somewhat different constructions of the coacting refining members.

Fig. VIII is a vertical axial section of a refining member, illustrating yet another construction.

Fig. IX shows an axial section through part of a refining member, illustrating still another construction, on a larger scale than Figs. I, VII, and VIII.

Fig. X is a plan or facial view of a segment of the refining members shown in Fig. IX.

Fig. XI shows an axial section through part of a coacting pair of refining member faces different from those shown in Figs. I—X, also on a larger scale than Figs. I, VII, and VIII.

Fig. XII is a plan or facial view of a segment of one of the refining members shown in Fig. XI.

Fig. XIII shows a vertical axial section through an attrition mill refiner conveniently embodying my invention, with refining members of yet another form of construction.

Fig. XIV is a plan view of the refiner illustrated in Fig. XIII.

Fig. XV shows a vertical section through the refiner taken as indicated by the line and arrows XV—XV in Fig. XIII, the refining facing being omitted.

Fig. XVI is a fragmentary diagrammatic illustration of an axial section through part of a coacting pair of refining members different from those hereinbefore referred to; and Fig. XVII is a corresponding plan or facial view of a segment of one of these refining members.

Fig. XVIII is a view similar to Fig. XVII illustrating a modification of the disc face.

Figs. I—VI illustrate the application of my invention to an attrition-mill refiner comprising coacting refining members or "rotor" discs 10, 11 arranged coaxially for rotation relative to one another, and mounted (as here shown) on shafts 13, 14. The working faces 15, 15 of the refining members 10, 11 may be embodied in or carried by detachable parts 16, 17 of substantially identical annular disc form, with a central cavity or chamber 18 whence the stock or pulp flows outward through the annular "refining pass" between the faces 15, 15. For admission of pulp to the cavity 18, the rotor 10 is shown with an annular intake-passage 19 in its central hub portion 20, around its inner hub 21 in which the shaft 13 is keyed and secured. This inner hub 21 is connected to the outer hub by vanes 22 between which the pulp can pass freely.

As shown in Figs. I and II, the annular supporting plates 16, 17 that carry the facings 15, 15 are secured to the refining members or rotors 10, 11 by bolts 23 extending through the members 10, 11 and taking into the plates 16, 17. The plates 16, 17 are centered by engagement of annular grooves in the plates over annular ridges or ribs 24, 24 on the members 10, 11. The center of the plate 16 is open at 25 around the nut 26 that holds the rotor 10 on its shaft 13, to admit the pulp from the intake 19 to the central cavity 18. The center of the plate 17 is closed, thus excluding the pulp from the nut 26x on shaft 14; but it is annularly recessed or dished to an arcuate profile at 27, to spread the axial pulp stream from the intake opening 25 into an annular outflow to the annular refining pass between the facings 15, 15.

This general design and construction of the refining members 10, 11 corresponds substantially or approximately to what is disclosed in my Patent No. 2,035,994, granted March 31, 1936 on my application Serial No. 746,646, filed October 3, 1934, and in U. S. Letters Patent No. 1,984,869, December 18, 1934, Farley and Brown. It has been here described for the sake of clearness and as a background for the explanation of my present invention, now presently to follow. However, the design and construction of refining members to which elastic refining surfaces according to my present invention are applicable may vary quite widely, and may be radically different from any herein illustrated or described.

The refining disc facings 15, 15 shown in Figs. I and II are just alike, as well as their support or backing plates 16, 17 and their attachment to the latter, so that in the following description only the facing 15 on the supporting plate 16 will be referred to. This facing 15 consists of a thick sheet or disc of elastic friction material, such as gutta percha or rubber, say about 2 in. thick, mounted on the plate 16 in any way that will hold it firmly under all the stresses of service. As shown, the rear surface of the annular disc 15 seats against the surface of the plate 16 and its inner and outer peripheral edges lie adjacent or abut against annular shoulders 28, 29 on the plate, preferably formed by separate rings detachably secured to the plate, as by lag screws or bolts 31 having their heads countersunk in the rings. The outer and inner peripheral edges of the rings 28, 29 are undercut (bevelled), and the inner and outer edges of the disc 15 are correspondingly reduced (bevelled), so as to interlock with the rings.

As an alternative or additional means of securing the disc 15, either its rear surface or its edges, or both, may be cemented, vulcanized, or otherwise adhesively attached to the plate 16 or to the shoulders 28, 29, either or both. Even without undercut or interlocking engagement between the disc edges and the shoulders 28, 29, adhesive attachment as just described secures the disc 15 very firmly. Yet another means of securing the disc 15 to the plate 16 is shown in Figs. I and II, a means useful in supplementation of adhesive attachment or of interlocking peripheral engagement, or both, but effective without either of them, or even without any rings or shoulders 28, 29 whatever. This means consists of lag screws or bolts 33 for clamping the disc 15 to the plate 16, having their heads countersunk in the plate 16, and preferably taking into headed metal insets 34 embedded in the thickness of the disc 15, well behind its front acting surface.

Any and all of the securing means constructed as so far described act to hold the disc 15 firmly in place against the plate 16; but only the adhesive attachment and the bolts positively resist the tendency to turn the disc relative to the plate under the circumferential forces due to relative rotation of the coacting refining members 10, 11. As an additional or alternative means of resisting such turning, the inner and outer disc edges and the plate shoulders 28, 29 may be correlatively formed for anti-turning engagement or interlocking, as by a toothed or multi-tongued conformation. In Fig. II, the coacting disc edges and shoulders 28, 29 are shown correspondingly wavy at 36, 36, as well as beveled, so as to interlock something like the edge of a pie in a wavy-edged pie-pan.

Like pneumatic tire-casings for automobiles, or like the rubber-and-fabric discs used in flexible-disc universal joints, the refining disc 15 is preferably reinforced with suitably-arranged rubberized fabric embedded in its thickness, as indicated at 37, 37 in Fig. I. Ample thickness of rubber or the like to give smoothness and elasticity should be provided over the layer of fabric 37 nearest the working face of the disc 15. The edges of the fabric sheets 37, 37 here shown extend out to the very edges of the disc 15 at its inner and outer peripheries, so as to reinforce and cooperate with the rubber or the like of the disc tongues 36 where they engage the plate-shoulder-tongues at 28, 29. For a like purpose, the holes for the shanks of the insets 34 in the fabric sheets 37 are preferably made to fit these shanks quite snugly, as is also the rubber or other elastic material of the disc 15. As best shown in Fig. III, the heads of the insets 34 lie against a rubberized fabric sheet 37. The insets 34 may be cemented into the rubber of the disc 15, but are preferably embedded therein before the rubber is vulcanized, and subsequently vulcanized into adhesion to it, in the usual vulcanization of the rubber.

As shown in Figs. II—VI, the elastic facing 15 has therein a plurality of radially extending flow grooves 40 similar to one another and equally spaced. Thirty-two such grooves 40 to the total circumference are indicated in Fig. II, although a much less or much greater number might be used.

Each groove 40 extends across the flat surface at 15 from the inside facing-bevel 41, on ring 28, substantially or nearly to the outer facing periphery, and has its bottom rounded transversely: i. e., circumferentially of the face 15. In the present instance, the grooves 40 gradually or progressively diminish in depth from their inner to their outer ends, and their bottoms gradually "flatten" with a diminishing (arcuate) curvature and an increasing radius. As shown, the grooves 40 also gradually widen a little outward across the face 15, though not so much as would correspond to the flattening of their bottom curvature; for their edges for at least part of their length are much steeper than would correspond to the general curvature of their bottoms, as indicated at 42 in Fig. VI. The annular corner between each flat main working surface at 15 and the inner bevel 41 is eased or rounded at 43, on the inner ring 28, and the walls of the grooves 40 at their inner ends merge into the bevel 41 with like rounding 44.

Besides the conduct of the outflow through the grooves 40 by their outward-diminishing depth and cross-section, an outer flow-controlling facial zone 45 is preferably provided adjacent the periphery of the face 15, affording more limited cross-section and width of passage thereacross for the stock and its fibrous particles than the grooved facial refining areas or working zone inside of it. Any degree of restriction desired may be provided at this outlet-controlling zone 45, from total absence of any outflow grooves or channels thereacross as one extreme, up to grooving nearly or virtually equivalent to the outer ends of the grooves 40 in cross-section or depth as the other extreme. As regards maximum fibrous particle size in the pulp, the effective width of outlet passage across the zones 45, 45 of the coacting faces 15, 15 is equal to any working gap between the surfaces 15, 15 at these zones plus the depth of the deepest outflow grooves in the zone 45 of either face 15, 15. As shown in Fig. II, the outflow-control zone 45 is formed entirely by the face of the outer ring 29 above mentioned, which has small, shallow semi-circular flow-grooves or notches 47 thereacross, preferably in line with some or all of the main flow grooves 40. The aggregate cross-sectional area and the effective width of outlet passage across the zone 45 can be varied and adjusted as desired by providing a plurality of interchangeable rings 29, differently grooved; and thus the maximum size of the refined fibers in the pulp can be controlled and varied.

To illustrate suitable proportions for one of the working faces and its various features, for certain uses, it may be of 30 in. outside diameter, 19⅞ in. minimum inside diameter, 20¼ in. inside diameter to the intersection of the inner bevel 41 with the surface 15, disregarding the rounding away of their corner at 43, and 2 in. thick. The grooves 40 may be $\frac{7}{16}$ in. deep at their inner ends and rounded to a ⅝ in. radius, and at their outer ends in the disc 15 about $\frac{3}{32}$ to ⅛ in. deep and rounded to a 3¼ in. radius. As shown in Figs. II and III, the grooves 40 are extended part way into the outflow zone 45, tapering upward rather steeply to its flat surface. The width of plain surface between adjacent grooves 40 may be ⅞ in. at the inner ends of the grooves. Outflow-control grooves 47 may be $\frac{1}{16}$ in. wide and $\frac{3}{32}$ in. deep, more or less: their number, width, and depth may be varied according to the degree of refining required, one being shown in Fig. II for each groove 40.

Elastic working faces 15 with grooving, etc., of the form, proportions, and dimensions exemplified in Figs. II—VI and in the preceding paragraph are adapted for treating relatively soft fibrous particles considerably larger than the ground-wood screenings and the like usually considered proper material for refining, such, for example, as soft spruce or other wood chips, and especially chips or other large fibrous particles that have been softened by cooking or partial digestion, which may even go to the extent of a partial chemical digestion, such as a sulphate or sulphite digestion. For example, spruce or other chips may be cooked with steam or hot water; or they may be digested in any usual way with an aqueous "liquor" of calcium bisulphite ($Ca(HSO_3)_2$) at a temperature gradually rising to about 135° C., usually with about 11 hours total treatment of the chips in the digester. Pulp resulting from treatment of these partially digested chips in a refiner with the working faces 15, 15 of Figs. I—VI may be screened through a pulp screen of 50 to 60 meshes per sq. in. to remove oversize particles, and then mixed with ground-wood in the proportions required for newsprint, catalogue, or other similar grades of paper.

The construction and operation of the complete refiner comprising the members 10, 11 may be as disclosed in my Patent No. 2,035,994, granted March 31, 1936 on my application, Serial No. 746,646 or in the aforesaid Patent No. 1,984,869, including the bearings for the shafts 13, 14, the motors for driving them, the casing for enclosing them, the provisions for bringing them together and separating them, and maintaining a fixed, constant working clearance between them when desired, the base or frame structure for supporting and maintaining them all in position, and the arrangements for feeding in the pulp, etc., etc. The rotors 10, 11 may be oppositely driven by variable-speed electric motors, and the pulp may be fed to the refiner from a regulable constant-head head-box of any suitable type and construction. However, these and other features of the refiner can be widely varied, or even radically changed, being here referred to merely for specific illustration of one general organization in which my elastic refining surfaces may be used.

The use of an elastic-faced refining member in combination with a metal or stone-faced one is illustrated in Fig. VII, where the member 11a has a metal facing 15b. While the coacting member 10a and its elastic facing 15a might be just like the member 10 and facing 15 of Figs. I and II, yet in Fig. VII a somewhat different construction is shown, in which the elastic member 15a is yieldingly held up to its work by fluid pressure. Accordingly, the member 10a has a trough-like annular air-chamber 50 in its flat face which carries the elastic disc 15a, and is provided with a metal inlet tube 51 (similar to that of a pneumatic tire) through which it may be charged with a liquid or a gas (such as water or air) to any desired pressure. Besides the usual check-valve (not shown), etc., the metal inlet-tube 51 may preferably be provided with a rotary plug-valve or stop-cock 52 to assure against gradual loss of air-pressure by leakage. The elastic disc 15a may be adhesively attached (cemented or vulcanized) to the annular seating surfaces of the member 10, and may be additionally secured by bolts 33 and metal insets, etc., such as described above in connection with Figs. I and II. The disc 15a is shown with fabric reinforcing sheets 37, 37, similar to those in Fig. I.

In this construction, the elastic facing 15a embodies all the facial features of the refining member 10a, including an outflow control-zone or check-ring corresponding to that afforded by the metal securing-ring 29 in Figs. I and II. Being rigidly backed with metal, such outflow-control zone may be less yielding than a pneumatically sustained main working face inside of it. The like applies to its innermost portion which acts to initially break up the larger fibrous particles. The metal facing 15b may include a separately detachable and readily changeable outer ring section 29b embodying its outflow-control zone, if any.

Fig. VIII illustrates another construction for a refining member with an elastic facing 15c sustained by fluid pressure. Here the air-chamber 50c contains an inflated air-cell 53 corresponding to the inner tube of an automobile tire. Its metal air-inlet tube 51c, similar to that shown in Fig. VII, extends out through a hole in the rear wall of the air-chamber 50c. The elastic facing 15c has its inner and outer edges reduced (bevelled) to engage behind undercut annular (bevelled) shoulders 28c, 29c on the refining member, which are preferably formed by detachable metal rings like those in Figs. I and II, with their edges wavy or otherwise suitably shaped for anti-turning engagement with the correspondingly-shaped edges of disc 15c. The disc 15c is shown with fabric reinforcement 37, and may also have radial stiffening 54 consisting of metal rods between two of its fabric reinforcing sheets 37. Extending radially from the inner disc edge to the outer edge at suitably close intervals, the rods 54 prevent the disc 15c from bellying outward and blowing out under the air pressure behind it. As shown in Fig. VIII, the outer metal ring 29c may embody an outflow-control zone for the disc 15c, just like the ring 29 in Figs. I and II.

A refining member such as shown in Fig. VIII may be used with another of like construction, or with an elastic-faced refining member such as shown in Figs. I and II, or in Fig. VII, or with an inelastic-faced refining member like that of Fig. VII.

While the outflow-control afforded by the ring 29c in Fig. VIII may be varied and adjusted by interchange of such rings, just as in the case of Figs. I and II, the construction shown in Fig. VIII permits a different mode of adjustment, either alternative or supplemental. This may be accomplished by altering the proximity of the coacting refining members to one another (e. g., as described in Patent No. 1,984,869), so as to vary the distances apart of their outflow-control zones or check rings, and compensatively changing the fluid pressure in the chamber 50c, so as to keep the working relation between the rest of disc 15c and the coacting working face the same as before. The like may also be done with the fluid-sustained or pneumatic arrangement of Fig. VII.

Of course a change in fluid pressure may be used to alter the working relation when desired.

Figs. IX and X illustrate refining members with elastic facings 15d, 15d resembling the facing 15a of Fig. VII, but sustained throughout directly by the solid metal of the refining member 10d, without any fluid pressure feature, and without any separate mounting plate like the plate 16 in Fig. I. At the junction of the main working face with its grooves 40d and the outflow control zone or check ring 45d, the facing 15d is fortified with an annular facial zone or section 55 of relatively rigid material, such as metal, belonging partly to the working face and partly to the check ring 45d. As here shown, this rigid zone or section 55 does not involve division of the elastic facing 15d into separate parts within and outside the zone 55, but consists of a flat annular insert set into the rubber of the facing, and elastically backed or cushioned by the rubber behind it, amounting as shown to about half the total thickness of the facing 15d. This inset ring 55 is shown with anchorage projections or dowels 56 on its back, engaged in the rubber behind to prevent the inset 55 from turning relative to the rubber. The relatively rigid zone 55 includes the outer ends of the grooves 40d, which diminish in depth on a sharper outward taper than the portions of the grooves inside such zone. This rigid zone 55 sustains the specially severe stresses and wear to which the disc face is subjected as somewhat oversize particles in the outer ends of the grooves 40d are reduced. Thus this zone 55 greatly prolongs the life of the whole facing 15d, which if its surface were entirely elastic would also suffer great wear and tear from slightly oversized particles working between the plain faces in the outflow control zone.

As shown in Figs. IX and X, the successive facial zones or sections of the refining members 10, 11 have rather different facial features. While the grooving in the two inner zones 57, 58, diminishes in depth substantially uniformly from the central opening 25 or eye 18 of the disc outward, there are many more grooves in the outer zone 58 than in the inner zone 57: in the present instance, twice as many, though not quite so wide. The inner and outer grooves 61 and 62 are so interrelated and interconnected as to afford a plurality of independent radially extending channeled courses for pulp flow, divided, however, amongst more of the grooves 62 than of the grooves 61. In the present instance, each such course consists of a single groove 61 in the inner central portion of the disc, but further outward from the center comprises a pair of the grooves 62, in parallel with one another and in series exclusively with the one single groove 61. As shown in Fig. X, the outer end of each inner groove 61 is flared outward to about double width to cover two adjacent outer grooves 62, 62, whose inner ends are flared toward one another to their junction; or in other words, each inner groove 61 forks and divides directly into two outer grooves 62, 62. The outer ends of the grooves 62 extend into the check-ring 45d with a taper in depth more rapid than for the rest of their length. As shown, these grooves 62 diminish in depth to nothing in about ⅓ the width of the check-ring 45d, which is shown wider in proportion to the total radial disc width than in Fig. II. The bottoms of the intake ends of the inner grooves 61 turn pronouncedly downward; and groups of these inner grooves merge into large supply pockets 64 which are separated by stout webs 65. The downward and inward-sloping bottoms of these pockets 64 compensate more or less for their inward diminution in width. The outermost zone or solid check-ring 45d has grooves 47d thereacross corresponding to those in the ring 29 in Fig. II, though less numerous: e. g., there is such a groove 47d to every fourth groove 62 only, leading directly from its outer end. As shown in Fig. X, the grooves 61, 62 are not exactly radial, but slope back slightly, counter to or trailing the rotation of the refining member. Besides grooves 47d open into some of the grooves 62, the flow-control zone or check-ring 45d may also have grooves 66 open into the outer ends of these and other grooves 62, but extending only part way (about three-fourths, as shown) across the check-ring. Like the grooves 47d, such grooves 66 tend to prevent formation or persistence of a film of fine fiber particles on the plain surface of the check-ring 45d, especially in refining thoroughly digested chemical pulps such as sulphate or sulphite pulp. As here shown, there are two grooves 66 (or 47d and 66) opening into each groove 62. The grooves 47d and 66 may have a greater trailing slope than the grooves 61 and 62.

For disc faces of an outside diameter of about 48 in. and an inside diameter of 10 in. at the extreme inner, rear corner of the facing 15e, the diameter at the front corner of the facing may be 11 in., and the diameter at the point where the bottoms of the grooves 61 turn downward, and these grooves start to diverge from radial, may be 16 in. The extreme depth of the supply pockets 64 below the plain disc surface may be about 1¼ in. The diameter at the extreme inner ends of the grooves 62 (as defined by the sharp corner between those served by the same groove 61) may be 28¾ in.; and the radial width of the outflow-control zone 45d may be 3 in. The grooves 61 may be ¾ in. wide, and may vary in depth from ⅜ in. at their own inner ends to ¼ in. at the inner ends of the grooves 62; their bottoms may be rounded to a radius of ⁷⁄₁₆ in., and at their inner ends their sides may be square with the plain disc surface for a short distance below the latter. The grooves 62 may be ⅝ in. wide, and may vary in depth from ¼ in. at their inner ends to ⅛ in. at the inner edge of the outflow-control zone 45d, extending 1 in. into the latter, with a uniform diminution in depth from ⅛ in. to zero at their outer ends; their bottoms may be rounded to a radius of ⁹⁄₁₆ in., and at their inner ends their sides may be square with the plain disc surface for a short distance below the latter. The flared ends of grooves 61 and 62, where they join, may have their corners rounded to a radius of something like ⅜ to ¼ in., with flat bottom surfaces tangent to the corner curvatures. The grooves or orifices 47d may be ⁹⁄₁₆ in. wide, ³⁄₃₂ in. deep, and semi-circularly rounded. There may be some 48 of the grooves 61, 96 of the grooves 62, and 24 of the through grooves 47d. The dead-end grooves 66 may be ⁹⁄₁₆ in. wide, ³⁄₃₂ in. deep, and semi-circularly rounded. In the zone 45d, there may be some seven of the grooves 66 between adjacent grooves 47d, arranged about as shown, making a total of some 168 dead-end grooves 66 for this zone. The divergence of the grooves 61 and 62 from a true radial direction may be about 10°, and that of the grooves 47d and 66 about 25°.

The grooving shown in Fig. X and just described is suitable for a facing either entirely of metal or stone, or entirely elastic, whether used with a similar coacting all-metal facing, or with an entirely elastic facing, or with a composite facing such as shown in Figs. XI and XII, to be presently described.

Fig. XI illustrates a pair of coacting refining members 10, 11 whose working faces present several more or less distinct annular zones or sections 57e, 58e, 59e, and 57f, 58f, 59f, preferably separate and separately mounted on the supporting plates 16, 17, and of different character or material according to their functions. The inner sections 57e, 57f are of the stiffest, most unyielding material, usually metal, to crack or split large, hard or tough particles. The intermediate sections 58e, 58f, which rub or brush out the fibers, besides splitting up the larger cracked or split particles that are still oversize, may be of either inelastic or elastic material, metal or solid rubber. One of the outermost, outlet-controlling sections 59e may also be of either metal or rubber, preferably solid; while the coacting section 59f will usually be of elastic material (rubber), and preferably sustained by fluid pressure. As shown, the edge of each section overlaps that outside of it, on a bevel, to assist in holding it in place. The sections may also be secured by bolts or adhesively, as by vulcanizing or cementing them to the plate 16 or 17 or to each other, or both. The outlet-control or check-ring section 59f is shown as pneumatically inflated, and constructed like a single-tube tire with fabric reinforcement 37 (woven, knit, or cord) at least toward its working face. At its outer side, this section 59f has a reduced or rabbeted corner which engages behind a shoulder 29f on the support 17, here shown as formed by the inturned edge of a continuous metal band 60 fitting around the periphery of said support 17, and secured by screws or the like. The fluid-inlet 51, similar to those in Figs. VII and VIII, is accommodated in a recess or slot in the edge of the support 17, and projects out through a hole in the band 60.

By varying the pressure in the inflated checkring 59f, the clearance or gap and the effective area and width of passage between the outflow-control zones 59e, 59f can be varied and adjusted to control the maximum fiber particle size in the refined product; and this does not entail any relative shift of the refining members 10, 11, or any variation of the working relation between the working faces of said members, comprising their zones 57e, 58e, and 57f, 58f. Thus this adjustable check-ring 59f serves the purpose of an adjustable screen for excluding oversize particles from the product. The coacting fluid-sustained or pneumatic check-ring 59f may also have grooves 47e, like 47d, 66 (Fig. X) if desired.

Figs. XIII, XIV, and XV illustrate a refiner with one revolving refining member 10g on a shaft 13 and one stationary refining member 11g. The shaft 13 may be driven from any source of power affording constant speeds changeable as desired, and is here shown as provided with a coupling flange 67 for connecting it to a variable-speed electric motor or the like (not shown). The stationary refining member 11g is attached to the corresponding side of the casing 68, here shown as formed by a casting which also includes a pedestal support 69 for the anti-friction ball-equipped bearing 70 of the shaft 13 that carries the revolving refining member 10g, as well as a pulp supply conduit 71 that opens through the stationary refining member 11g into the central pulp cavity 18. The casing 68 is shown provided with a removable top or cover portion 72, including the upper half of its cylindrical outer wall and of its right-hand end wall. This casing part 72 may be of sheet metal, with a bottom flange 73 of cast or wrought metal welded on, to engage the corresponding flange on the portion 68. As shown, the casing 68 and the flange 73 include portions which cooperate to form a stuffing-box 74 around the shaft 13, to prevent leakage of pulp.

As shown in Fig. XIII, the refining members 10g, 11g have shallow annular cavities 50g, 50g, in which are accommodated and engaged elastic facings 15g, 15g, here shown as pneumatically inflated annular cells resembling so-called "single tube" tires in construction, though much flatter in form. As shown in Figs. XIII and XV, the outer peripheries of the facings 15g, 15g are wavily serrated, for anti-turning engagement with the correspondingly serrated surfaces of the outer flanges 29g bounding the annular cavities or recesses 50g of the refining members 10g, 11g. As here shown, the elastic facings 15g, 15g embody all facial features of the refining members 10, 11, including outflow-control zones 45g as well as working faces proper with their flow grooves, such as shown in Figs. II—VI, for example. Both sides of each facing cell are adapted to serve as working faces, so that the cells may be reversed to change the acting faces for different kinds of pulp, or when the faces have become seriously worn. The cells 15g, 15g have fabric reinforcement 37, resembling that of a tire casing or of a flexible disc for a universal joint.

For convenience in inflating the stationary facing 15g, an inlet tube 51 extends out through the outer flange 29g and also to one side out through the wall of the casing 68, so that this facing can be inflated or the pressure changed even during operation of the refiner. For the revolving facing 15g, a preferred arrangement consists of a connection through the shaft 13 that likewise allows of inflating the facing 15g or changing the pressure therein when the refiner is in operation. For this purpose, an air-tube 51 extends through the inner flange 28g into the central cavity 21g of the member 10g to a bore 75 extending (axially) through the shaft 13. As shown, the tube 51 is detachably connected to the bore 75 by a fitting 76 screwed into the end of the bore. A cover plate 77 may be secured over the cavity 21g to exclude pulp therefrom. For supplying air to the bore 75, there is an annular air-chamber 78 around the shaft 13, and a connecting hole 79 from the bore 75 out through the shaft. The air-chamber 78 may be carried by a bracket 80 on the pedestal 69, and provided with stuffing boxes 81, 81 to prevent leakage of air along the shaft. Air under any desired pressure may be supplied to the chamber 78, through a pipe connection 82 from any suitable source.

A mode of operating the refiner shown in Figs. XIII—XV is as follows:

In starting the refiner, water is fed in through the inlet 71 and out through the refining pass between the acting faces 15g, 15g while the refining member 10g is being brought up to the desired operating speed. During this time, the cells 15g, 15g are kept charged with air to such pressure that a clearance or gap of about .01 inch will be maintained by the water between their faces under these conditions. When the desired operating speed has been reached, pulp is fed in at 71 and the water cut off, and the air pressure in the cells 15g, 15g is then raised to such a value that the desired working clearance of .001 to .005 inch is maintained between their faces under this condition: i. e., by the pulp between the faces. The proper cell pressure for a particular working relation and speed of revolution having once been ascertained, such relation can always be reproduced whenever desired, regardless of wear of the disc faces: i. e., wear will be compensated automatically when sufficient air to produce the desired pressure in the cells is supplied. In like manner, the disc faces 15g, 15g will automatically retrue themselves, as their outer zones wear more rapidly than their inner zones. This is also more or less true of the fluid-sustained working faces and flow-control zone in Figs. VII, VIII and IX.

It will be understood, of course, that inflated facing cells such as 15g might be used in one or both of a pair of refining members both of which revolve; also, that facings such as shown in Figs. I—XII might be used in a refiner only one of whose refining members revolves, as in Figs. XIII—XV. While, furthermore, a refiner face with radially extending grooves permitting continuous flow of pulp thereacross and a surrounding outflow-control zone or check-ring such as in Figs. II, X and XII is the most efficient type known to me, so that I have given detailed and specific illustrative information relating thereto, yet it is to be understood that the utility of my invention is not limited thereto, but extends to other types of rubbing faces, whether grooved, recessed, or plain.

All of the elastic refining surfaces thus far specially described have flow grooves across the working face, and a surrounding flow-control zone. Rigid refining surfaces practically require substantial area and volume of grooving to give reasonable capacity for commercially practicable disc size and power consumption. While grooving is also advantageous in elastic refining surfaces, it is not essential, or required to the same extent as in rigid surfaces, and can even be dispensed with entirely. This is illustrated in Figs. XVI and XVII, which show elastic annular refining members or disc faces 15h, 15h of elastic material like rubber, mainly ungrooved, but provided with a series of rounded pulp-supply recesses or pockets 64h around their central opening or eye 18h. These recesses 64h are deeper radially than their circumferential width, but extend only about ⅓ across the disc faces, and may be shorter than this, or may even be omitted entirely. However, the recesses 64h are useful to allow entrance of pulp between the discs 10h, 11h while running against each other under such pressure as to compress their surfaces elastically somewhat. Under centrifugal force, the pulp in the eye 18h of the discs 10h, 11h and in the recesses 64h is forced in between the plain disc surfaces adjacent the recesses, opening up a gap between the discs, as at A, by elastic compression of the disc material. By the relative rotation of the discs 10h, 11h, and their resilient pressure, the fiber particles in the pulp are reduced in size and rubbed and squeezed, which fibrilates the pulp fibers. The reduction in particle size and the increased flexibility of the reduced particles facilitates the centrifugal outflow of pulp between the discs 10h, 11h. As the outflowing pulp spreads out over the increased disc surface, as at B, the width of gap required and existing between the disc faces 15h, 15h to accommodate the amount of pulp that has been able to enter between the discs is correspondingly less; so that at B particles that were or have become too small to be acted on in the wider gap at A are further reduced and rubbed and rendered still more flexible. This facilitates the further centrifugal outflow of the pulp, which spreads out over the further increased disc surface as at C, where the gap required to accommodate it is still less; so that at C particles too small to be acted on at A or B are still further reduced and rubbed, and rendered yet more flexible. Thus the elasticity or resilient yielding of the disc surfaces results in an automatic adjustment of the gap between the disc surfaces from the center outward according to the particle sizes from point to point; so that elastic pressure to work the fiber particles effectively is exerted on them throughout their outward travel. Wear of the disc faces is thus largely equalized, besides being automatically compensated by the resilience of the discs, even when not perfectly uniform.

With flat-faced rigid discs of stone or metal, on the other hand, the gap is initially uniform, and remains so until wear takes place. If the gap is too great anywhere in the outward travel of the pulp, e. g., in excess of .003 in. for the refining of already fine fibers, then no work is done on the pulp at that point. If the gap were made coarse enough to permit a reasonably large flow of pulp through the refiner, then practically all the work would be done in a relatively narrow zone around the eye of the discs, and only large particles would be reduced at all, unless, of course, the disc faces were provided with flow grooves such as shown in Figs. II, X or XII, for example. In this case, however, the rigid disc faces would wear most rapidly at and near the outer outflow control zone or check-ring; and hence after a certain amount of use, the gap at the check-ring could not be made small enough to prevent pulp from going through more or less unrefined.

For effective refining, giving a low freeness of the product in a single pass through the refiner, the working gap between the refining surfaces at the check-ring must be so very small as about .001 in., for example; so that combined wear of some .002 to .003 in. at the check-rings of the coacting discs will cause objectionable variations in refiner capacity, in freeness drop produced in a single pass, and in power consumption.

Ungrooved resilient-faced discs such as shown in Figs. XVI and XVII obviate these difficulties, since their resilience maintains effective pressure on the fibers over the entire disc faces 15h, 15h and produces an automatic adjustment of the gap that compensates for uneven wear, as well as for original slight inequalities due to workmanship. However, it may be found desirable in practice to provide elastic disc faces such as shown in Figs. XVI and XVII with isolated small recesses or short grooves 66h, corresponding to those in Fig. X and for a similar purpose, as is illustrated in Fig. XVIII.

Having thus described my invention, I claim:

1. A fiber pulp refiner comprising relatively revolving coaxial refining members with opposed coacting working faces substantially parallel and enlarging outward around their axes, and traversed transversely of the circumferential direction of the relative movement of their said faces by the fiber stock being treated, at least one of said refining members having in its working face a plurality of concentric sections, including a yielding section of rubber-like elastic friction material for rubbing fibers in the pulp and a metal-faced section for splitting over-size fibrous particles.

2. A fiber pulp refiner comprising relatively revolving coaxial refining members with opposed coacting working faces substantially parallel and enlarging outward around their axes, and traversed transversely of the circumferential direction of the relative movement of their said faces by the fiber stock being treated, at least one of said refining members having for its working face a facing of rubber-like elastic friction material, and also a metal facial ring coacting with a facial zone of the other refining member to control the outflow from between the members.

3. A fiber pulp refiner as set forth in claim 2 wherein the metal facial ring there referred to is inset in the elastic facing material, which extends behind it and elastically sustains it.

4. A fiber pulp refiner comprising relatively revolving coaxial refining members with opposed coacting working faces substantially parallel and enlarging outward around their axes, and traversed transversely of the circumferential direction of the relative movement of their said faces by the fiber stock being treated, at least one of said refining members having for its working face a flexible solid facing of rubber-like friction material to coact directly with the working face of the other refining member, and including elastic-fluid cushion means directly behind said facing for yieldingly sustaining it in effective co-action with said other member.

5. A fiber pulp refiner as set forth in claim 4 wherein the elastic-fluid cushion means comprises a backing of sponge rubber for the flexible facing.

6. A fiber pulp refiner comprising relatively revolving coaxial refining members with opposed coacting working faces substantially parallel and enlarging outward around their axes, and traversed transversely of the circumferential direction of the relative movement of their said faces by the fiber stock being treated, at least one of said refining members having a flexible facing for coacting directly with the working face of the other refining member and being provided with means for applying sustaining fluid pressure behind said facing to maintain it in effective co-action with said other member.

7. A fiber pulp refiner as set forth in claim 6 having means for supplying or changing the sustaining fluid pressure applied behind the flexible facing there referred to while the refining member to which it pertains is revolving.

8. A fiber pulp refiner as set forth in claim 6 wherein the flexibly faced refining member there referred to comprises an inflated elastic cell for the sustaining fluid pressure that maintains the flexible facing in effective co-action with the other refining member.

9. A fiber pulp refiner as set forth in claim 6 wherein the flexibly faced refining member there referred to comprises as its flexible facing and pressure-applying means a fluid-charged annular friction-surfaced facing-cell for coacting directly with the working face of the other refining member.

10. A fiber pulp refiner as set forth in claim 6 wherein the flexibly faced refining member there referred to comprises as its flexible facing and pressure applying means a fluid-charged friction-surfaced facing-cell for coacting directly with the working face of the other refining member, and is provided with means for supplying or changing pressure in said cell while the refiner is in operation.

11. A fiber pulp refiner as set forth in claim 6 wherein the flexibly faced refining member there referred to has an annular recess, and the fluid-sustained flexible facing is mounted in said recess in peripheral anti-turning engagement with the recess wall.

12. A fiber pulp refiner as set forth in claim 6 wherein the flexibly faced refining member there referred to has an annular recess, and the flexible facing and pressure applying means comprise an inflated friction-surfaced facing cell in said recess in anti-turning engagement with the outer recess wall.

13. A fiber pulp refiner as set forth in claim 6 wherein the fluid-sustained flexible facing and pressure applying means there referred to comprise a fluid-charged friction-surfaced peripheral check-ring for coacting directly with the other refining member to control the outflow from between the members.

14. A fiber pulp refiner as set forth in claim 6 wherein the working face of the flexibly faced refining member there referred to includes an inner metal-faced zone and an elastic-faced zone around it, and its flexible facing and pressure applying means comprise an outer fluid-charged check-ring around said metal-faced and elastic-faced zones.

DANIEL MANSON SUTHERLAND, Jr.